United States Patent [19]

Cottington et al.

[11] Patent Number: 4,973,612
[45] Date of Patent: Nov. 27, 1990

[54] SILANE FREE RADIATION CURABLE ABRASION RESISTANT COATING COMPOSITION CONTAINING AN UNSATURATED ORGANIC COMPOUND

[75] Inventors: Levi J. Cottington, Midland County; Anthony Revis, Saginaw County, both of Mich.

[73] Assignee: Dow Corning Corporation, Midland, Mich.

[21] Appl. No.: 443,546

[22] Filed: Nov. 30, 1989

[51] Int. Cl.$^5$ ............... C08F 20/04; C08F 220/04; C08K 5/54
[52] U.S. Cl. ............... 522/84; 522/183; 522/182; 526/318.3
[58] Field of Search ............... 522/183, 84; 526/318.3

[56] References Cited

U.S. PATENT DOCUMENTS 3,796,687 3/1974 Collette et al. ............... 526/318.3
4,478,876 10/1984 Chung ............... 522/182

FOREIGN PATENT DOCUMENTS 1181809 8/1986 Japan .
286409 11/1988 Japan .

Primary Examiner—Marion C. McCamish
Assistant Examiner—Susan Berman
Attorney, Agent, or Firm—Robert L. McKellar

[57] ABSTRACT

The present invention relates to coating compositions which contain multifunctional acrylates, unsaturated organic compounds and aqueous dispersions of colloidal silica. Transparent, abrasion resistant coatings result from the cure, either by ultraviolet light or electron beam radiation, of these compositions on solid substrates.

21 Claims, No Drawings

SILANE FREE RADIATION CURABLE ABRASION RESISTANT COATING COMPOSITION CONTAINING AN UNSATURATED ORGANIC COMPOUND

BACKGROUND OF THE INVENTION

This invention relates to a radiation curable protective coating composition. More specifically, it relates to a silane free coating composition which contains an unsaturated organic compound. When applied to a substrate and radiation cured, this composition forms a protective, abrasion resistant, weather resistant, ultraviolet light resistant, transparent coating firmly held thereon. In addition, substrates coated with this composition may be tinted and/or dyed. Current markets for such coatings are well established and will expand as the abrasion resistance and weatherability of these coatings is improved.

Until recently, silanes were thought to be necessary, but costly components of all abrasion resistant coating formulations. The use of silanes, however, has been eliminated where colloidal silica dispersed in an organic solvent is used. Japanese Kokai Patent No. Sho 63[1988]-286409 issued Nov. 24, 1988, discloses a method for manufacturing a curable resin composition which contains an α,β-unsaturated carboxylic acid compound and colloidal silica. These coatings, however, have one major drawback. They do not allow aqueous dispersions of colloidal silica to be used. Since aqueous dispersions of colloidal silica are, by far, the most common and readily available, a major segment of the colloidal silica market is excluded.

Commonly assigned copending U.S. application Ser. No. 07/423,159, filed Oct. 18, 1989, eliminated the costly silanes from abrasion resistant coating formulations containing aqueous dispersions of colloidal silica. The aforementioned commonly assigned application discloses silane free coating compositions which contain aqueous dispersions of colloidal silica, hydroxy acrylates and multifunctional acrylates. The present inventors have eliminated the need for hydroxy acrylates by adding unsaturated organic compounds in silane free compositions which contain aqueous dispersions of colloidal silica.

SUMMARY OF THE INVENTION

Accordingly, it is one object of the present invention to provide a silane free abrasion resistant coating for solid substrates, without adding hydroxy acrylates.

Another object of the present invention is to provide a silane free abrasion resistant coating composition in which aqueous dispersions of colloidal silica may be used.

Still another object of this invention is to provide an improved abrasion resistant coating composition for solid substrates which is curable by either electron beam or ultraviolet light radiation.

These and other objects ar accomplished herein by a radiation curable coating composition comprising:

(A) at least one multifunctional acrylate monomer;

(B) an unsaturated organic compound selected from the group consisting of (i) at least one alcohol, selected from the group consisting of

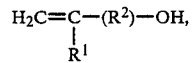

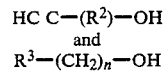

(ii) at least one acid selected from the group consisting of

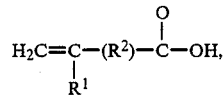

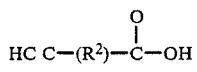

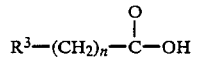

and (iii) mixtures thereof, wherein $R^1$ is hydrogen or monovalent hydrocarbon radical;

$R^2$ is selected from the group consisting of a divalent hydrocarbon radical having from 1 to 8 carbon atoms and a divalent hydrocarbon radical having from 1 to 8 carbon atoms which contains at least one hydroxy group;

$R^3$ is selected from a cyclic olefin containing 5 to 10 carbon atoms; optionally substituted with one or more aliphatic or aromatic ether groups;

n is an integer form 0 to 6;

(C) aqueous dispersion of colloidal silica.

DETAILED DESCRIPTION OF THE INVENTION

Component (A) of this novel composition comprises at least one acrylate monomer which contains two or more functional groups selected from the group consisting of acryloxy and methacryloxy groups. These multifunctional acrylate monomers may be used singly or in combination with other multifunctional acrylate monomers. Some preferred multifunctional acrylate monomers useable as component (A) include: diacrylates of the formulas;
1,6-hexanediol diacrylate,
1,4-butanediol diacrylate,
ethylene glycol diacrylate,
diethylene glycol diacrylate,
tetraethylene glycol diacrylate,
tripropylene glycol diacrylate,
polyethylene glycol diacrylate,
1,4-butanediol dimethacrylate,
poly(butanediol) diacrylate,
tetraethylene glycol dimethacrylate,
1,3-butylene glycol diacrylate,
triethylene glycol diacrylate,
triisopropylene glycol diacrylate,
neopentyl glycol diacrylate,
bisphenol A dimethacrylate,
triacrylates of the formulas;
trimethylolpropane triacrylate,
trimethylolpropaue trimethacrylate, pentaerythritol monohydroxy triacrylate,
trimethylolpropane triethoxy triacrylate,
tetraacrylates of the formulas;
pentaerythritol tetraacrylate,
di-trimethylolpropane tetraacrylate,
pentaacrylates of the formulas;
dipentaerythritol (monohydroxy) pentaacrylate.
These multifunctional acrylate monomers are commercially available from Aldrich Chemical Company, Inc., Milwaukee, Wisc.

The second component (B) of this composition comprises an unsaturated organic compound selected from the group consisting of:

(i) at least one alcohol, selected from the group consisting of

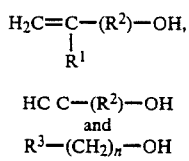

(ii) at least one acid selected form the group consisting

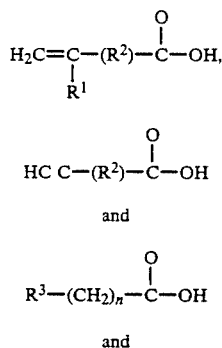

(iii) mixtures thereof, wherein $R^1$ is hydrogen or a monovalent hydrocarbon radical.

$R^2$ is selected from the group consisting of a divalent hydrocarbon radical having from 1 to 8 carbon atoms and a divalent hydrocarbon radical having from 1 to 8 carbon atoms which contains at least one hydroxy group. The exact nature of the organic portion of $R^1$ is not critical to the operability of this invention, but said organic portion must exclude functionality which would interfere with the radiation curing of either the vinyl or the hydroxy functional groups of the unsaturated organic compound.

$R^3$ is selected from a cyclic olefin containing 5 to 10 carbon atoms; optionally substituted with one or more aliphatic or aromatic ether groups. The letter n is an integer from 0 to 6. Some preferred unsaturated organic compounds usable as component (B) include:
4-penten-1-ol
7-octene-1,2-diol
2-propen-1-ol
propargyl alcohol
4-pentenoic acid
10-undecenoic acid
2-cyclopentene-1-acetic acid
4-(2-cyclohexenyloxy)benzoic acid
4-pentenoic acid
3,5-cyclohexadiene-1,2-diol
2-cyclohexen-1-ol These unsaturated organic compounds are commercially available from Aldrich Chemical Company, Inc., Milwaukee, Wisc.

The third component (C) of this composition comprises silica in the form of a colloidal dispersion. Colloidal silica is a dispersion of submicron-sized silica ($SiO_2$) particles in an aqueous or other solvent medium. The colloidal silicas used in this composition are dispersions of submicron size silica ($SiO_2$) particles in an aqueous or in a water/organic solvent mixture. Colloidal silica is available in acid or basic form. Either form may be utilized. An example of satisfactory colloidal silica for use in these coating compositions is Nalco 1034A colloidal silica (Nalco 1034A), Nalco 1129 colloidal silica (Nalco 1129), Nalco 2327 colloidal silica (Nalco 2327), Nalco 2326 colloidal silica (Nalco 2326), and Nalco 1140 colloidal silica (Nalco 1140), which can be obtained from Nalco Chemical Company, Naperville, Ill.

Nalco 1034A has a mean particle size of 20 nm and an $SiO_2$ content of approximately 34% by weight in water with a pH of approximately 3.1. Nalco 1129 has a mean particle size of 20nm and an $SiO_2$ content of approximately 30% by weight in a solution of 40% isopropanol and 30% water. Nalco 2327 has a mean particle size of 20nm and an $SiO_2$ content of approximately 40% by weight in water with a pH of approximately 9.3, and ammonium as the stabilizing ion. Nalco 2326 has a mean particle size of 5nm and an $SiO_2$ content of approximately 14.5% by weight in water with a pH of approximately 9.0, and ammonium as the stabilizing ion. Nalco 1140 has a mean particle size of 15nm and an $SiO_2$ content of approximately 40% by weight in water with a pH of approximately 9.7, and sodium as the stabilizing ion.

Other additives can be added to the compositions in order to enhance the usefulness of the coatings. For example, leveling agents, ultraviolet light absorbers, hindered amine light stabilizers (HALS), oxygen inhibitors, dyes and the like, can be included herein. All of these additives and the use thereof are well known in the art and do not require extensive discussions. Therefore, only a limited number will be referred to, it being understood that any of these compounds can be used as long as they do not deleteriously effect either the radiation curing or the transparency of the coating.

A particularly desirable additive has been found to be a small amount of a leveling agent. Leveling agents can be used on the substrates to cover surface irregularities and to aid in the uniform dispersion of the coating composition. These agents are especially useful in compositions where all the solvent has been removed. For purposes of the present invention, the addition of 0.01 to 5.0 percent commercial silicone glycol leveling agents, work well to provide the coating composition with desirable flowout and wetting properties.

Also useful as additives to the present coating compositions are UV absorbers and hindered amine light stabilizers. UV absorbers and hindered amine light stabilizers act to diminish the harmful effects of UV radiation on the final cured product and thereby enhance the weatherability, or resistance to cracking, yellowing and delamination of the coating. A preferred hindered amine light stabilizer is bis(1,2,2,6,6-pentamethyl-4-piperidinyl)[3,5-bis(1,1-dimethylethyl-4-hydroxyphenyl)methyl]butylpropanedioate, available as Tinuvin® 144, from CIBA-GEIGY Corporation, Hawthorne, N.Y.

For the purpose of the present compositions the following UV absorbers and combinations thereof in concentrations of less than 20 weight percent based on the total composition, have been shown to produce desirable results: bis(1,2,2,6,6-pentamethyl-4-piperidinyl)(3,5-bis(1,1-dimethylethyl 1-4-hydroxyphenyl)methyl)butylpropanedioate, 2-ethylhexyl-2-cyano-3,3 -diphenylacrylate, 2-hydroxyl-4-n-octoxybenzophenone, 2-(2 -hydroxy-5 -methylphenyl)benzotriazole, poly(oxy-1,2-ethanediyl),alpha-(3-(3-(2H-benzotriazol-2-yl)-5-(11-dimethylethyl)-4-hydroxylphenyl)-1-oxopropyl)-omega-hydroxy, and Uvinul® D-50 and MS-40, sold by BASF Wyandotte Inc., Parsippany, N.J. Concentrations of UV absorbers, however, in the range of 1 to 5 percent based on the total weight of the composition are preferred.

Incorporating UV absorbers into the instant compositions will permit the curing process regardless of whether UV or electron beam radiation is used to cure the composition. However, in the situation where UV radiation is to be used to cure the composition, the amount of UV absorbers added must be carefully controlled so as not to hinder the cure. This limitation does not exist in the case of electron beam radiation cure.

In the practice of the present invention, the radiation curable compositions can be made by combining the multifunctional acrylate monomers and unsaturated organic compounds with a given quantity of alcohol. Suitable alcohols, for example, include any water soluble or water miscible alcohol, for example, methanol, ethanol, propanol, butanol, etc., or ether alcohols, such as ethoxyethanol, butoxyethanol, methoxypropanol, etc. For purposes of the present invention, applicants prefer to use isopropanol.

Generally, the manner in which these components are mixed together is not important. A small amount of an organic acid may, optionally, be added dropwise to the mixture. Suitable organic acids include, for example, acetic acid, propionic acid and benzoic acid, etc. The colloidal silica is then added while agitation is applied to the mixture. After allowing the mixture to stand for a period of time, the volatiles may optionally be removed under reduced pressure and/or the mixture may, be filtered. Especially in the case where solvents have been removed, the addition of acrylate monomers to the residue may, in some instances, prove to be desirable.

According to the coating process of the present invention, the above described compositions are coated on a substrate using conventional coating techniques modified as appropriate to the particular substrate. For example, these compositions can be applied to a variety of solid substrates by methods such as roller coating, flow coating, dip coating, spin coating, spray coating and curtain coating. These various methods of coating allow the compositions to be placed on the substrate at variable thicknesses thus allowing a wider range of use of the compositions. Coating thicknesses may vary, but for improved abrasion resistance coating thicknesses of 2-25 microns, preferably about 5 microns, are recommended.

The compositions may then be cured by either ultraviolet light or electron beam radiation. Ultraviolet light may be used to cure the compositions if one or more photoinitiators is added prior to curing. There are no special restrictions on the radical-type photoinitiators as long as they can generate radicals by the absorption of optical energy. Ultraviolet light sensitive photoinitiators or blends of initiators which may be used in the UV cure of the present composition include 2-Hydroxy--methyl-1-phenyl-propan-1-one (Darocur® 1173), sold by EM Industries, Inc., Hawthorne, N.Y., and 2,2-Dimethoxy-2-phenyl-acetyl-phenone (Irgacure® 651), sold by Ciba-Geigy Corporation, Hawthorne, N.Y. In addition, cationic-type photoinitiators such as Cyracure® UVI 6974 or UVI 6990, sold by Union Carbide Corporation, Danbury, Conn., may also be used in conjunction with the radical-type photoinitiators. For purposes of this invention, it has been found that from 0.05 to 5 weight percent based on the total solids in the composition, of the photoinitiators described herein will cause the composition to cure.

Oxygen inhibitors, which are materials used in conjunction with photoinitiators that increase their efficiency, may also be added. An example of a preferred oxygen inhibitor is 2-ethylhexyl-para-dimethylaminobenzoate, available as Uvatone® 8303, from The UpJohn Company, North Haven, Conn.

Alternatively, the coating composition may be electron beam radiation cured. Electron beam sources of various types such as van de Graaff-type, resonance transformer-type, linear-type, dynatron-type, and high frequency-type can be used as a source of electron beam. Electron beam having energy of from 50 to 1000 KeV, preferably from 100 to 300 KeV discharged therefrom, may be irradiated in a dose of from 0.1 to 10.0 Mega Rads (MR). A particularly preferred source of electron beam is one wherein a continuous curtain-like beam is irradiated from linear filaments. Examples of commercially available sources of electron beam are Electro Curtain CB-150 available from Energy Sciences Inc., and NP-ESH 150 available from Otto Durr.

The curable composition obtained by the process of the present invention is coated on the surface of a substrate (e.g., polycarbonate, etc ) After said composition has been ultraviolet light or electron beam treated, a cured coating film is formed.

By choice of the proper formulation and application conditions including the optional use of a leveling agent, the compositions can be applied and will adhere to substantially all solid substrates. Substrates which are especially contemplated herein are transparent and nontransparent plastics and metals. More particularly, these plastics are synthetic organic polymeric substrates such as acrylic polymers like poly(methylmethacrylate); polyesters, such as poly(ethylene terephthalate), poly (butylene terephthalate), etc.; polyamides; polyimides; acrylonitrile-styrene copolymers; styrene-acrylonitrile-butadiene copolymers; polyvinyl chloride; butyrates; polyethylene; polyolefins and the like including modifications thereof. The compositions of this invention are especially useful as trausparent coatings for polycarbonates such as poly(bisphenol-A carbonate) and those polycarbonates known as Lexan®, sold by General Electric Company, Schenectady, N.Y.; and as coatings for acrylics such as polymethylmethacrylates. Metal substrates on which the present compositions are also effective include bright and dull metals like aluminum and bright metallized surfaces like sputtered chromium alloy. Other solid substrates contemplated herein include wood, painted surfaces, leather, glass, ceramics, textiles and paper.

The apparatus and testing procedures used for the results shown herein are as follows:

Abrasion Test (Tabor Test)

Abrasion resistance was determined according to ASTM Method D-1044. The instrument used was a Teledyne Taber model 503 Taber Abraser with two 250 gram auxiliary weights (500 gram load) for each of the CS10F abrasive wheels. The acrylic and polycarbonate test panels were subjected to 100 and 500 cycles on the abraser turntable. The percent change in haze which is the criterion for determining the abrasion resistance of the coating is determined by measuring the difference in haze of the unabrased and abrased coatings. Haze is defined as the percentage of transmitted light which, in passing through the sample, deviates from the incident beam by forward scattering. In this method, only light flux that deviates more than 2.5 degrees on the average is considered to be haze. The percent haze on the coatings was determined by ASTM Method D1003. A Gardner Haze Meter was used. The haze was calculated by measuring the amount of diffused light, dividing by the amount of transmitted light and multiplying by one hundred.

Adhesion Test

Adhesion was measured by cross-hatch adhesion. A series of cross-hatch scribes are made in an area of one square inch with lines to form 1/10 inch squares. This surface is covered with 1.0 inch No. 600 Scotch Brand adhesive tape which is pressed down firmly over the cross-hatched area. The tape is withdrawn from the surface of the substrate with one rapid motion at about a 90° angle. This action of applying and removing the tape is carried out three times and then the substrate is observed. The number of squares remaining intact on the substrate are reported as a percentage of the total number of squares on the grid.

Steel Wool Test

A two inch square of 0000 steel wool was applied over the face of a 24 oz. hammer and was secured with a rubber band. Coated sample blanks were tested for scratch resistance to 20 double rubs across the center of the sample with the weighted steel wool. The hammer is held by the end of its handle such that the majority of the pressure on the steel wool comes from the hammer head. The sample is graded according to the amount of scratching produced by the steel wool and hammer. The absence of scratches on the sample is graded a 1; slight scratching is graded a 2 and heavy scratching is graded a 3.

Pencil Test

This test is meant to be a qualitative method of determining scratch resistance of a coating. A coated panel is placed on a firm horizontal surface. A pencil is held firmly against the film at a 45° angle (point away from the operator) and pushed away from the operator in a ¼-in. (6.5-mm) stroke. The process is started with the hardest lead pencil and continued down the scale of hardness to the pencil that will not cut into or gouge the film. The hardest pencil that will not cut through the film to the substrate for a distance of at least ⅛ in. (3 mm) is reported according to the following scale from Berol Corporation, Brentwood, Tenn.:

softer                                 harder
6B, 5B, 4B, 3B, 2B, B, HB, F, H, 2H, 3H, 4H, 5H, 6H, 7H, 8H, 9H The HB grade is approximately equal to that of a #2 pencil. The F grade is slightly harder and is the one most commonly used. The H grades are harder than that and get progressively harder up through the 9H grade which is very hard. The B grade is softer than the HB grade and get progressively softer through the 6B grade which is very soft.

In order that those skilled in the art may better understand how to practice the present invention, the following examples are given by way of illustration and not by way of limitation. All parts and percentages in the examples are on a weight basis.

EXAMPLE 1

A mixture of 0.52 g of 4-penten-1-ol, 5.71 8 of trimethylolpropanetriacrylate and 51.46 g of isopropanol, was prepared. This mixture was allowed to stand for five minutes. Next, 11.24 g of Nalco 1034A was added while the mixture underwent agitation. The mixture was then allowed to stand for 18 hours, before being filtered through a five micron filter. The filtered sample was flow coated onto a 4×4 polycarbonate panel and allowed to air dry for five minutes. The sample was then cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 2

A mixture of 1.04 g of 2-propen-1-ol, 5.18 g of trimethylolpropanetriacrylate and 51.46 g of isopropanol, was prepared. This mixture was allowed to stand for five minutes. Next, 11.24 g of Nalco 1034A was added while the mixture underwent agitation. The mixture was then allowed to stand for 18 hours, before being filtered through a five micron filter.

The filtered sample was flow coated onto a 4×4 polycarbonate panel and allowed to air dry for five minutes. The sample was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 3

A mixture of 1.73 g of 7-octene-1,2-diol, 4.49 g of trimethylolpropanetriacrylate and 51.46 g of isopropanol, was prepared. This mixture was allowed to stand for five minutes. Next, 11.24 g of Nalco 1034A was added while the mixture underwent agitation. The mixture was then allowed to stand for 18 hours, before being filtered through a five micron filter. The filtered sample was flow coated onto a 4×4 polycarbonate panel and allowed to air dry for five minutes. The sample was cured by electron beam under 4 MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 4

A mixture of 0.52 g of 4-penten-1-ol. 5.71 g of trimethylolpropanetriacrylate and 51.46 g of isopropanol, was prepared. This mixture was allowed to stand for five minutes. Next, 11.24 g of Nalco 1034A was added while the mixture underwent agitation. To 10.0 g of this mixture was added 0.07 g of 2-Hydroxy-2-methyl-1-phenyl-propan-1-one (Darocur® 1173), sold by EM Industries, Inc., Hawthorne, N.Y. and 0.02 g of 2-ethylhexyl-para-dimethylaminobenzoate, (Uvatone® 8303), from The UpJohn Company, North Haven, Conn. This mixture was flow coated onto a 4×4 polycarbonate panel, which was allowed to air dry for 5 minutes. The coated polycarbonate sample was then UV cured by passing the sample through a medium pressure mercury vapor arc lamp with an average intensity of 91.56 mW/cm$^2$ at a line speed of three feet per minute. The test results are summarized in Table I.

EXAMPLE 5

A mixture of 1.04 g of 2-propen-1-ol, 5.18 g of trimethylolpropanetriacrylate and 51.46 g of isopropanol, was prepared. This mixture was allowed to stand for five minutes. Next, 11.24 g of Nalco 1034A was added while the mixture underwent agitation. To 10.0 g of this mixture was added 0.07 g of 2-Hydroxy-2-methyl-1-phenyl-propan-1-one (Darocur® 1173), sold by EM Industries, Inc., Hawthorne, N.Y. and 0.02 g of 2-ethylhexyl-para-dimethylaminobenzoate, (Uvatone® 8303), from The UpJohn Company, North Haven, Conn. This mixture was flow coated onto a 4×4 polycarbonate panel, which was allowed to air dry for 5 minutes. The coated polycarbonate sample was then UV cured by passing the sample through a medium pressure mercury vapor arc lamp with an average intensity of 91.56 mW/cm$^2$ at a line speed of three feet per minute. The test results are summarized in Table I.

EXAMPLE 6

A mixture of 1.08 g of 4-pentenoic acid, 3.79 g of trimethylolpropanetriacrylate, 1.36 g of hexanedioldiacrylate, and 51.46 g of isopropanol, was prepared. This mixture was allowed to stand for five minutes. Next, 11.24 g of Nalco 1034A was added while the mixture underwent agitation. This mixture was then flow coated onto a 4×4 polycarbonate panel and allowed to air dry for five minutes. The sample was cured by electron beam under 4MR, 160KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 7

A mixture of 1.08 g of 10-undecenoic acid, 3.79 g of trimethylolpropanetriacrylate, 1.36 8 g of hexanedioldiacrylate, and 51.46 g of isopropanol, was prepared. This mixture was allowed to stand for five minutes. Next. 11.24 g of Nalco 1034A was added while the mixture underwent agitation. This mixture was then flow coated onto a 4×4 polycarbonate panel and allowed to air dry for five minutes. The sample was cured by electron beam under 4MR, 160KeV electron dose at a belt speed of 68 feet per minute under a six inch wide electron beam operated with a 4 milliamp electron current in a nitrogen atmosphere containing 200 ppm oxygen. The test results are summarized in Table I.

EXAMPLE 8

A mixture of 0.52 g of 4-penten-1-ol, 5.71 g of trimethylolpropanetriacrylate and 51.46 g of isopropanol, was prepared. Next, 11 24 g of Nalco 1034A was added while the mixture underwent agitation. The mixture was then allowed to stand for 18 hours, before being vacuum stripped at 40° C. and 2 mm Hg, on a rotoevaporator until all volatiles were removed. The sample was then flow coated onto a 4×4 polycarbonate panel and electron beam cured under 4MR, 160 KeV electron dose at a belt speed of 68 feet per minute under a six inch wide electron beam operated with a 4 milliamp electron current in a nitrogen atmosphere containing 200 ppm oxygen. The test results are summarized in Table I.

TABLE I

| | Properties of Coated Polycarbonate | | | | |
| --- | --- | --- | --- | --- | --- |
| | ADHESION | STEEL | PENCIL | ABRASION TEST | |
| Coating Compositions | TEST | WOOL | TEST | % H$_{100}$ | % H$_{500}$ |
| Example 1 | 100% | 2 | HB | 2.6 | 9.6 |
| Example 2 | 100% | 2 | HB | 2.0 | 8.2 |
| Example 3 | 100% | 2 | HB | 14.8 | 24.1 |
| Example 4 | 100% | 1 | HB | 0.6 | 2.6 |
| Example 5 | 100% | 2 | F | 0.4 | 3.0 |
| Example 6 | 100% | 3 | HB | 3.3 | 7.4 |
| Example 7 | 100% | 3 | HB | 14.5 | 21.4 |
| Example 8 | 100% | 2 | HB | 3.7 | 12.2 |

As the results in Table I clearly indicate, abrasion resistant coating compositions comprising multifunctional acrylates, unsaturated organic compounds and aqueous dispersions of colloidal silica may be easily manufactured. Furthermore, excellent results were obtained whether the coating compositions were cured by ultraviolet light or by electron beam radiation.

Many variations will suggest themselves to those skilled in this art in light of the above detailed description. All such obvious modifications are within the full intended scope of the appended claims.

What is claimed is:

1. A radiation curable coating composition comprising:
   (A) at least one multifunctional monomer;
   (B) an unsaturated organic compound selected from the group consisting of
   (i) at least one alcohol, selected from the group consisting of

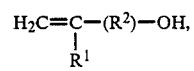

-continued $$HC\ C-(R^2)-OH$$
and
$$R^3-(CH_2)_n-OH$$

(ii) at least one acid, selected from the group consisting of

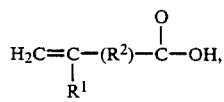

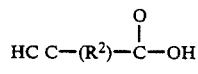
and

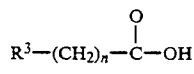
and (iii) and mixtures thereof, wherein
$R^1$ is hydrogen or a monovalent hydrocarbon radical;
$R^2$ is selected from the group consisting of a divalent hydrocarbon radical having from 1 to 8 carbon atoms and a divalent hydrocarbon radical having from 1 to 8 carbon atoms which contains at least one hydroxy group;
$R^3$ is selected from a cyclic olefin containing 5 to 10 carbon atoms; optionally substituted with one or more aliphatic or aromatic ether groups;
n is an integer from 0 to 6;
(C) aqueous dispersion of colloidal silica.

2. A composition as claimed in claim 1 wherein component (A) is trimethylolpropanetriacrylate.

3. A composition as claimed in claim 1 wherein component (A) is hexanedioldiacrylate.

4. A composition as claimed in claim 1 wherein component (A) is a mixture of trimethylolpropanetriacrylate and hexanedioldiacrylate.

5. A composition as claimed in claim 1 wherein component (B) is an unsaturated organic compound selected from the group consisting of 4-penten-1-ol, 7-octene-1,2-diol, 2-propen-1-ol, 4-pentenoic acid, 10-undecenoic acid, 2-cyclopentene-1-acetic acid, 4-(2-cyclohexenyloxy)benzoic acid, 4-pentenoic acid, 3,5-cyclohexadiene-1,2-diol, 2-cyclohexen-1-ol and mixtures thereof.

6. A composition as claimed in claim 5 wherein the unsaturated organic compound is 4-penten-1-ol.

7. A composition as claimed in claim 5 wherein the unsaturated organic compound is 7-octene-1,2-diol.

8. A composition as claimed in claim 5 wherein the unsaturated organic compound is 2-propen-1-ol.

9. A composition as claimed in claim 5 wherein the unsaturated organic compound is 4-pentenoic acid.

10. A composition as claimed in claim 5 wherein the unsaturated organic compound is 10-undecenoic acid.

11. A composition as claimed in claim 5 wherein the unsaturated organic compound is 2-cyclopentene-1-acetic acid.

12. A composition as claimed in claim 5 wherein the unsaturated organic compound is 4-(2-cyclohexenyloxy)benzoic acid.

13. A composition as claimed in claim 1 wherein component (C) is a dispersion of colloidal silica in an organic solvent and water.

14. A composition as claimed in claim 13 wherein the organic solvent is isopropanol.

15. A composition as claimed in claim 1 which additionally contains one or more photoinitiators.

16. A composition as claimed in claim 15 wherein the photoinitiator is 2-hydroxy-2-methyl-1-phenyl-propan-1-one.

17. A composition as claimed in claim 15 which additionally contains one or more oxygen inhibitors.

18. A composition as claimed in claim 17 wherein the oxygen inhibitor is 2-ethylhexyl-para-dimethylaminobenzoate.

19. The product obtained by the cure of the composition of claim 1.

20. The product obtained by the cure of the composition of claim 15.

21. A process for preparing a silane free radiation curable coating composition comprising
(I) combining
(A) at least one multifunctional acrylate monomer;
(B) an unsaturated organic compound selected from the group consisting of
(i) at least one alcohol, selected from the group consisting of

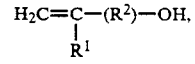

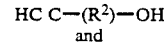
and

(ii) at least one acid selected from the group consisting of

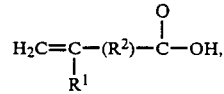

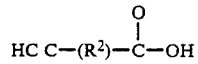
and

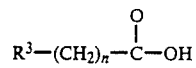
and (iii) mixtures thereof.
wherein
$R^1$ is hydrogen or a monovalent hydrocarbon radical;
$R^2$ is selected from the group consisting of a divalent hydrocarbon radical having from 1 to 8 carbon atoms and a divalent hydrocarbon radical having from 1 to 8 carbon atoms which contains at least one hydroxy group;
$R^3$ is selected from a cyclic olefin containing 5 to 10 carbon atoms; optionally substituted with one or more aliphatic or aromatic ether groups;
n is an integer from 0 to 6;
(II) mixing the product of (I) with
(C) an aqueous dispersion of colloidal silica.

* * * * *

Disclaimer 4,973,612—*Levi J. Cottington*, Midland County; *Anthony Revis*, Saginaw County, both of Mich. SILANE FREE RADIATION CURABLE ABRASION RESISTANT COATING COMPOSITION CONTAINING AN UNSATURATED ORGANIC COMPOUND. Patent dated Nov. 27, 1990. Disclaimer filed Apr. 15, 1991, by the assignee, Dow Corning Corp.

Hereby enters this disclaimer to the remaining term of said patent.
[ *Official Gazette July 16, 1991* ]